United States Patent

Tripp et al.

[15] 3,673,585

[45] June 27, 1972

[54] POSITION MEASURING TRANSFORMER HAVING MULTIPLE INDEPENDENT SECTIONS FOR REDUCTION OF MEASUREMENT ERRORS

[72] Inventors: Robert W. Tripp, Tuckahoe; Robert Z. Geller, Wantagh, both of N.Y.

[73] Assignee: Inductosyn Corporation, New York, N.Y.

[22] Filed: Oct. 5, 1970

[21] Appl. No.: 77,765

[52] U.S. Cl. ........................340/198, 340/195, 340/347 SY, 336/129, 318/660
[51] Int. Cl. .........................................................G08c 19/00
[58] Field of Search....................340/198, 196, 195, 347 SY; 336/129, 123; 318/660

[56] References Cited

UNITED STATES PATENTS

| | | | |
|---|---|---|---|
| 3,235,781 | 2/1966 | Spencer | 340/196 |
| 3,555,542 | 1/1971 | Guiot | 340/198 |
| 3,562,740 | 2/1971 | Watkins | 340/198 |

*Primary Examiner*—John W. Caldwell
*Assistant Examiner*—Robert J. Mooney
*Attorney*—William E. Beatty and David E. Lovejoy

[57] ABSTRACT

A method and apparatus for measuring linear and rotary positions with position measuring data elements, such as position measuring transformers, where the data elements are affected by error-causing conditions such as eccentricity and skew. Measurements are made so as to avoid the compound effects of eccentricity and skew by dividing the conventional, continuous space-quadrature windings appearing on one member of the transformer, into a plurality of windings groups where the continuous winding of the other member remains unchanged. Each group typically includes a plurality of inter-connected sine and a plurality of inter-connected cosine winding sections where those winding sections are in space-quadrature of the pole cycle of the continuous winding. The measurements made from each group, in one embodiment, are averaged to form a highly error-free resultant measurement. In another embodiment, the difference between group measurements are employed to form a measurement of the eccentricity of one member with respect to the other.

17 Claims, 11 Drawing Figures

PATENTED JUN 27 1972 3,673,585

INVENTORS
ROBERT W. TRIPP
ROBERT Z. GELLER
BY W. E. Beatty
David E. Lovejoy
ATTORNEYS

POSITION MEASURING TRANSFORMER HAVING MULTIPLE INDEPENDENT SECTIONS FOR REDUCTION OF MEASUREMENT ERRORS

BACKGROUND OF THE INVENTION

The present invention relates to data elements for indicating and measuring rotary or linear positions. Typical data elements for such measurements are position measuring transformers of the type manufactured under the trademark Inductosyn. Specifically, the present invention relates to improved measurement methods and apparatus employing position measuring data elements.

Position measuring transformers usually have one member including a single continuous winding inductively coupled to two space-quadrature windings on another member. The inductive coupling between members is a function of the mechanical displacement (rotational of translation) of one member relative to the other member. The windings on the members are typically comprised of a plurality of conductor bars which extend transverse to the direction of relative movement of the two members. The conductor bars forming the space-quadrature windings on one member are in space-quadrature of the pole cycle of the conductor bars on the continuous winding of the other member. Those space-quadrature windings are typically identified as sine and cosine windings.

Improvement in the accuracy and operation of position measuring transformers is a continual objective. One prior art position measuring transformer which reduces errors caused by eccentricity and skew of the winding patterns in U.S. Pat. No. 2,799,835 entitled "Position Measuring Transformers", invented by R. W. Tripp et al. and assigned to the same assignee as the present invention. The error reduction in that patent is achieved by maintaining a specified ratio Of conductor bar width with respect to the space between conductor bars, use of a different pitch (periodicity) of the winding on one member with respect to the windings on the other member, and other techniques.

Another prior art position measuring transformer having improved accuracy employs multi-layer windings wherein the cofunction windings on one layer are arranged in the gaps of cofunction windings on the other layer so as to present the appearance of substantially a continuous winding. Such a transducer is described in U.S. Pat. No. 3,441,888 to C. L. Farrand, assigned to the same assignee as the present invention.

The tyPes of errors usually attendant position measuring transformers are described in the article "Inductosyn Angular Readout System of the U.S. Naval Observatory 6-Inch Transit Circle," 1969 Proceedings of Electro-Optical Systems Design Conference, pp. 634–641. As indicated therein and as is otherwise known (e.g. the above-noted U.S. Pat. No. 2,799,835) the mechanical misalignment of the two relatively movable members of a position measuring transformer gives rise, in the case of a rotary device, to an error that has a cycle of 360 mechanical degrees and hence is termed a once-per-revolution error. Perfectly aligned transducers have no errors but, of course, mechanical misalignment from imperfect mountings, bearings, and transducer plates always gives rise to errors of some degree.

These errors arising from mechanical misalignment are generally classified for rotary devices as errors due to eccentricity and errors due to skew. Eccentricity is a measure of the displacement of the centers of the rotor or stator windings with respect to the axis of rotation of the rotor. This eccentricity causes an asymmetry which varies the coupling between stator and rotor windings as a function of different positions of the rotor with respect to the stator. Skew is a measure of the non-orthogonality of the rotor and stator planes with respect to the axis of rotation of the rotor. This non-orthogonality causes the air gap to vary as a function of different rotor positions with respect to the stator.

While the prior art techniques employed in minimizing errors have been highly successful for general applications, there are occasions when even greater accuracy is desired. Such an application is in the accurate measurement and tracking of stars as carried out, for example, at the United States Naval Observatory as outlined in the above-referenced article. In such accurate applications, the compound effects of skew and eccentricity become of appreciable significance. While analyses of skew alone and eccentricity alone have been carried out and techniques for eliminating errors caused by these conditions separately are known, the compound effects still have presented errors which are undesirable.

SUMMARY OF THE INVENTION

The present invention provides methods and apparatus for improved measurements of linear and rotary positions where the effects of eccentricity, skew and other similar error-causing conditions attendant position measuring data elements are reduced and, in some cases, the conditions are measured.

In the present invention, measurements are made with position measuring transformers having their conventional, singular windings divided into a plurality of winding groups, such as four quadrants, where each group is independently operated to produce independent measurements. Each group typically includes a plurality of sine and a plurality of cosine related winding sections. In the case of four groups, four measurements rather than the conventional one are obtained. Each of those four measurements, one for each group, may be combined to form a resultant measurement which is less affected by errors resulting from the compound effects of eccentricity and skew than the conventional single measurement.

In accordance with one embodiment of the present invention, the measurements from each group are independently made and then averaged to form a resultant measurement which is more accurate than if all of the groups were serially inter-connected in a conventional manner to obtain the usual one measurement.

In accordance with another embodiment of the invention, differences between group measurements are employed to form a measure of the conditions causing errors.

A specific stator-energization embodiment of the invention employs a rotary position measuring transformer for measuring the space angle X between the transformer rotor and stator. The stator windings are divided into four groups, called quadrants, where each quadrant includes a sine winding and a cosine winding formed of sine and cosine winding sections, respectively. In operation, the transformer is employed in a system which may be operated in a readout mode to measure the space angle X or in a servo mode to command movement to the space angle X. Considering the readout mode by way of example, input signals having a trigonometric relation to an electrical angle Y are applied to the sine and cosine windings of the stator in one quadrant to induce an output signal in the continuous winding on the rotor proportional to sin(X-Y). That output signal is employed, using a digital counter for storing a representation of Y and a digital-to-analog converter for generating the input signals, to alter the input signals until the output signal developed is reduced to a null as occurs when the electrical angle Y is equal to and is therefore a measure of the space angle X. The value of Y, as appearing in the digital counter, is recorded as the measurement of the space angle X for the first group. Thereafter, the steps are repeated for each of the other three quadrants of the stator so as to obtain three more measurements of the space angle X. Thereafter, the four measurements of the space angle X are averaged to provide a highly accurate resultant measurement of the space angle X.

In a further embodiment of the present invention in which four groups are employed, the difference between the measurements in the first and third quadrants is obtained to form a measure of the eccentricity compOnent along a first axis bisecting the second and fourth quadrants. Similarly, the difference between the measurements from the second and fourth quadrants are determined to form a measure of the eccentricity component along a second axis, at right angles to the first axis, bisecting the first and third quadrants.

In a rotor-energization embodiment of the present invention, the rotor is energized with a constant amplitude AC signal so as to introduce in a plurality of stator winding groups sin(X) and cos(X) signals for each group, where the space angle X is the same as in the previous embodiment. The sin(X) and cos(X) signals, for each group, are supplied to a sine/cosine computer network which is controlled by an electrical angle Y so as to form a resultant signal output proportional to sin(X–Y). This rotor energization embodiment may also be employed in the servo and readout modes described above. Specifically, during the readout mode, the space angle X is held constant and the electrical angle Y is varied until the resultant signal from the computer network is a null as occurs when X equals Y. Similarly, the servo operation is carried out by holding the commanded input electrical angle Y a constant and varying the space angle X (by mechanically turning the rotor) again until the resultant signal from the computer network is a null as occurs when X equals Y.

The foregoing and other objects, features, and advantages of the invention will be apparent from the following more particular description of the preferred embodiments of the invention, as illustrated in the accompanying drawings.

BRIEF DESCRIPTION OF THE DRAWINGS

FIG. 4 (b) depicts the position measuring transformer of FIG. 2 with a schematic front view wherein the centers are concentric but wherein the planes are non-parallel so as to introduce skew.

DETAILED DESCRIPTION

Figure 1:
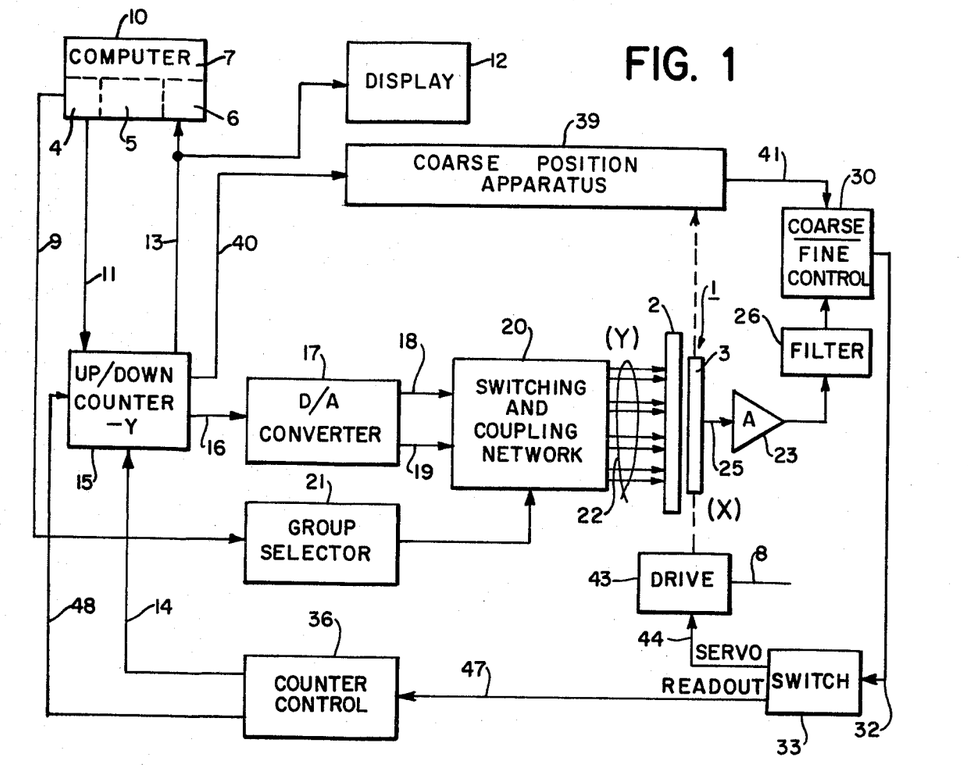
FIG. 1 depicts an apparatus in which a position measuring transformer is employed in servo and readout modes for position commanding and position measurement, respectively, and where the transformer stator windings are divided into and are energized by groups.

An apparatus for energizing independent winding groups of a position measuring transformer is generally depicted in FIG. 1. The apparatus of FIG. 1 is operational in two modes conveniently called the servo mode and readout mode.
Servo and Readout Modes In the servo mode, an electrical signal in the form of a constant command electrical angle Y is supplied to the stator 2 of the position measuring transformer 1 and the rotor 3 of position measuring transformer 1 is mechanically driven until the space angle X, measuring the relative position of rotor 3 with respect to stator 2, equals the electrical angle Y and therefore generates a null or zero voltage signal. In the readout mode, the reverse operation occurs in that the space angle X of the rotor serves as the constant input and the electrical angle Y is driven electrically until the resultant signal from the rotor is a null as occurs when X equals Y.

The servo and readout modes of operation of position measuring transformers are typically described in U.S. application, Ser. No. 809,533, filed 3/24/69, entitled Position Measuring System, and U.S. Pat. No. 3,514,775 entitled DIGITAL-TO-ANALOG CONVERTER both assigned to the same assignee as the present invention.

In the servo mode, the apparatus of FIG. 1 commands the rotor to a space angle and the rotor is driven until it assumes that position. In operation, a conventional digital computer 10 issues the initial command as a digital representation of the desired angular position of the rotor 3. The digital representation is transferred to an up/down counter 15. Counter 15 may be any conventional binary or other digital counter adapted and controlled for recording the desired position of rotor 3. The digital command in counter 15 is conveyed to a digital-to-analog (D/A) converter 17. D/A converter 17 converts the digital signal from line 16 to analog signals on lines 18 and 19. Lines 18 and 19 are typically designated sine and cosine lines because the signals thereon, while being of the same time phase, have amplitudes which are proportional to the sine and to the cosine, respectively, of the same electrical angle Y where the angle is related to the position of rotor 3. In conventional operation, lines 18 and 19 are connected directly, through suitable coupling devices such as transformers, to the stator 2 of transformer 1.

D/A converter 17 is typically like that disclosed in U.S. Pat. No. 2,849,668 assigned to the same assignee as the present invention. Counter 15 herein performs the switch selection (e.g. 105, FIG. 7 therein) function of the tape reader therein in a conventional manner. The sin and cos outputs (FIG. 7 therein) are analogous to the sine and cosine lines 18 and 19 herein. An alternative D/A converter suitable for use in the present invention is disclosed in the application Trigonometric Signal Generator And Machine Control, Ser. No. 864,079, filed 10/6/69, by R. W. Tripp and assigned to the same assignee as the present invention.

In accordance with the present invention, the sine and cosine signals on lines 18 and 19 are connected to a stator 2 through switches in switching and coupling network 20. Network 20 allows the sine and cosine signals on lines 18 and 19, under the control of groups selector 21, to be applied to predetermined winding groups on the stator 2. The network 20 functions, in one specific embodiment of the invention, to convert the pair of sine and cosine signals from lines 18 and 19 to four pairs of independently energizable sine and cosine signals schematically represented by the four pairs of lines 22. The lines 22 are connected to winding groups on the stator 2 of the transformer 1 in a manner described in more detail hereinafter.

The input signals applied via the lines 22 to the stator 2 of position measuring transformer 1 induce a signal in the rotor 3 which is a function of the space angle X of the rotor 3 with respect to the stator 2 and the electrical angle Y of the signals applied via lines 22. The resultant signal from the rotor 3 is generally a function of sin(X–Y). That resultant signal is conveyed via line 25 to a conventional amplifier 23 whereafter it is filtered in filter 26. The circuitry between and including D/A converter 17 and filter 26 is designated for and typically employed in measuring the fine portion of the rotation of the rotor 3 with respect to the stator 2. In many typical applications coarse positions are measured by conventional additional converters and transducers collectively represented by coarse position apparatus 39.

The coarse position apparatus 39 is typically connected between the up/down counter 15 via line 40 and the coarse/fine control 30 via line 41. In operation, the coarse position circuitry operates until the rotor 3 is within the range of the fine circuitry whereafter, in a conventional manner, the coarse positioning apparatus is disconnected by coarse/fine control 30. Assuming for the purposes of the present invention that the coarse position apparatus 39 has been disconnected, the signals from the filter 26 pass straight through the coarse/fine control 30 via line 32 to a switch 33. Switch 33 is any conventional switch delivering, in the servo mode, the resultant signal (error signal) from filter 26 to appropriate drive apparatus 43 via a line 44. Drive apparatus 43 includes appropriate motor control circuitry and a motor for rotating the rotor 3 of position measuring transformer 1 and hence changing the space angle X. Drive apparatus 43 drives the rotor 3 until the resultant signal on the lines 25 reaches a null (zero condition) which occurs generally when the space angle X equals the electrical angle Y. The rotor 3 becomes stationary when it assumes the position commanded by computer 10.

In the readout mode of operation, switch 33 is switched so that the resultant signal from filter 26 via line 32 is connected via a line 47 to an appropriate counter control 36. Counter control 36 supplies digital pulses and control signals to the up/down counter 15 via lines 48 and 14 until the resultant signal is zero. In operation, the drive 43 is typically energized, for example by a human operator via manual input 8, to move the rotor 3 to a position to be measured as defined by some unknown space angle X and thereafter the rotor is mechanically locked in that position while the measurement is performed. At the beginning of the measurement, the up/down counter 15 typically contains an arbitrary count remaining from a previous use of the counter specifying an electrical angle Y and that count is applied via line 16 through the D/A converter 17 to generate sine and cosine signals as a function of the electrical angle Y. Those signals are supplied to the stator 2 via lines 22. In general, the signals applied to stator 2, as a result of the arbitrary count, do not produce a null in the resultant signal on lines 25 since the electrical angle Y does not equal the space angle X. When X and Y are not equal, a resultant signal appears on line 25. That resultant signal is applied through the amplifier 23, filter 26, switch 33, and control 36 to change the contents of the up/down counter 15. A change in counter 15 changes, through D/A converter 17, the electrical angle Y of input signals on lines 22. The change in the electrical angle Y continues until the output on line 25 is again a null which occurs when, for the ideal case, Y equals X. When the output on line 25 is a null, signals are no longer applied via line 48 to the up/down counter 15 (or alternatively line 14 causes a change in direction allowing counter 15 to have a one count oscillation) so that the final contents of the counter 15 are a measure of the space angle X of the rotor 3. The electrical angle Y is represented by the count registered in counter 15 and is communicated to the computer 10 and to the display 12 via line 13. That count is typically recorded in the computer for future use.

For further details of the operation of a position measuring transformer in systems having servo and readout modes, the above-referenced U.S. Pat. No. 3,514,775 is hereby incorporated by reference in this application. Specifically, FIG. 9 therein (and the description thereof) depict an up/down counter 124 (underlined numbers refer to references in the U.S. Pat. No. '775 analogous to counter 15 herein where the input from 150c corresponds to line 48, and the output to elements 12, 30, and 38 correspond to line 16. The outputs from stator drivers 126 correspond to lines 18 and 19 and the output from 120 to line 25.

Computer 10 is a conventional digital computer including meanS 4 for recording the digital counts representing the electrical angles Y supplied via line 13, including means 5 for averaging the recorded values, including means 6 for subtracting the recorded values, and including control means 7. Control means 7 functions to supply a command input to counter 15 via line 11 and a group selection input via line 9 to control the operation of group selector 21. The operations of computer 10 are all conventional and are conviently implemented with an IBM 1800 digital computer.

Before referring to the operation of the switching and coupling network 20 and the group selector 21 which embody the group selection features of the present invention, a more detailed reference to the position measuring transformer 1 is useful.

Position Measuring Transformer

Figure 2:
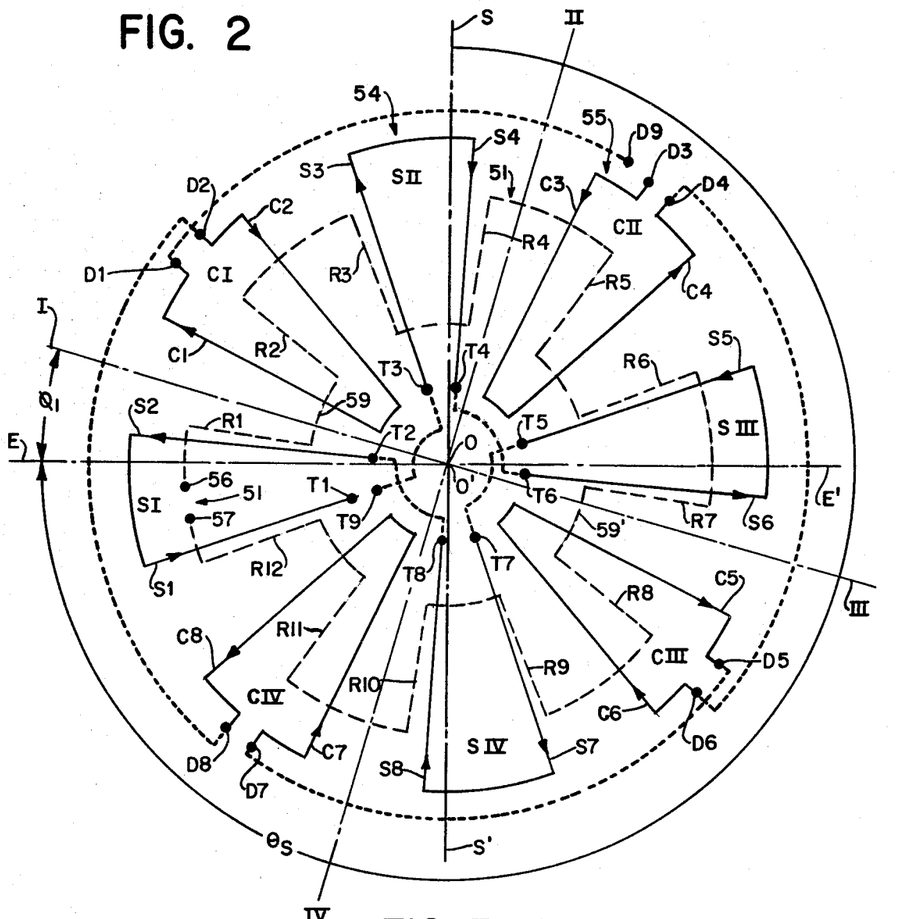
FIG. 2 depicts a schematic top view representation of the windings of a position measuring transformer, like that employed in FIG. 1, showing the relationship between the two windings in quadrature and the continuous winding.

A typical but simplified embodiment of the position measuring transformer 1 of FIG. 1 is shown in schematic detail in FIG. 2. Referring to FIG. 2, the continuous winding 51 represents the winding forming part of the rotor 3 of FIG. 1. Similarly, in FIG. 2, the sine winding 54 and the cosine winding 55 represent the windings forming part of the stator 2 of FIG. 1. Since FIG. 2 represents a top view, the winding 51 is shown by broken lines to designate that it is in a plane below the windings 54 and 55. Winding 51 includes 12 conductor bars R1, R2, . . . R12 which extend radially along imaginary lines passing through the center 0' of the winding 51. The conductor bars R1 through R12 are interconnected by outer conductors 59 and inner conductors 59' into six series connected winding sections which begin and end with terminals 56 and 57. The conductors 59-59' interconnecting the conductor bars R1–R12 are non-inductively related, in accordance with well-known principles, to the stator windings and hence they may be ignored.

Like the continuous winding 51, the sine winding 54 is formed with interconnected active conductor bars including eight conductor bars, S1, S2, . . . , S8 which are also located along imaginary radial lines passing through the center 0 of winding 54. Each pair of conductor bars, S1 and S2, S3 and S4, . . . , S7 and S8, is formed into a winding section so that winding sections SI, SII, SIII, and SIV, respectively, are formed. The sine winding 54, typically in the prior art, has its conductor bars and winding sections serially interconnected between terminals T1 and T9, where each terminal T1 to T8 appears at the inner end of a conductor bar, in the manner shown by dotted lines in FIG. 2. In accordance with the present invention, however, the interconnections shown as dotted lines, between the terminals T2 through T9, are not made in the conventional manner but rather are connected to switches SG1, SG2, SG3, and SG4 shown and described in connection with FIG. 5 hereinafter.

In a similar manner, the cosine winding 55 includes eight conductor bars C1, C2, . . . , C8 terminating along the outer ends, respectively, in terminals D1, D2, . . . , D8. As with the sine winding, the cosine windings are connected into winding sections CI, CII, CIII, and CIV which are in turn connected in series as shown by the dotted lines in FIG. 2 between terminals. In accordance with the present invention, the winding sections CI, CII, CIII, and CIV are connected to switches CG1, CG2, CG3, and CG4 shown and described hereinafter in connection with FIG. 5.

Figure 3:
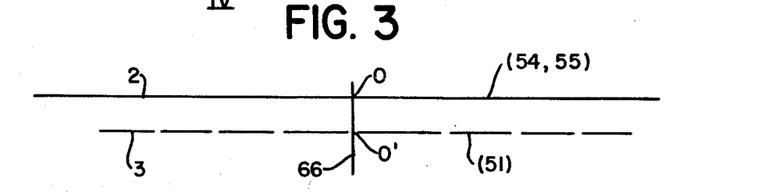
FIG. 3 is a front view of the superposed windings of FIG. 2 showing the parallel relationship of the planes and the concentricity of the winding patterns.

FIG. 3 is an edge view of the windings of FIG. 2 wherein the rotor 3 having the winding 51 and the stator 2 having the windings 54 and 55 are shown to be parallel while forming an axis 66 through their respective centers O and O' normal to the rotor.

Figure 4A:
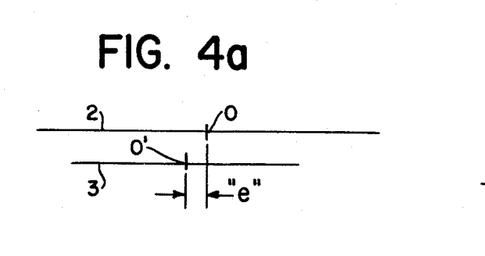
FIG. 4(a) depicts the apparatus of FIG. 2, with a schematic front view like FIG. 3, wherein the centers of the windings are displaced so as to create a condition of eccentricity.

FIG. 4(a) is a representation of the rotor and stator of FIG. 2 in which the rotor and stator centers have been shifted along the eccentricity axis E–E' (referring to FIG. 2) by an amount "e."In FIG. 4(a), the rotor plane 3 and the stator plane 2 remain parallel so that no skew exists.

Figure 4B:
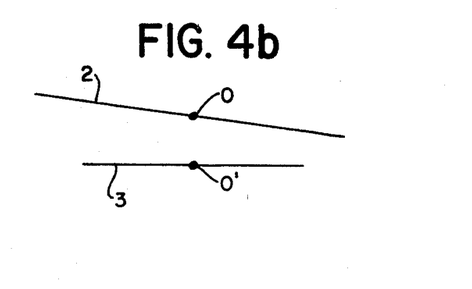

FIG. 4(b) depicts the position measuring transformer of FIG. 2 wherein the stator 2 has been skewed so that it is not parallel to the rotor 3. The centers O and O' still form an axis normal to the rotor.

Figure 4C:
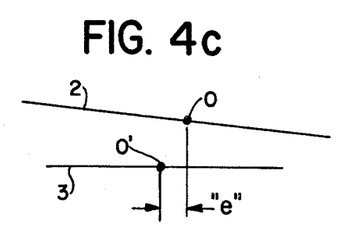
FIG. 4(c) depicts a schematic front view of the FIG. 2 transformer in which the eccentricity condition of FIG. 4(a) and the skew condition of FIG. 4(b) exist simultaneously.

FIG. 4(c) depicts the position measuring transformer of FIG. 2 wherein both the eccentricity of FIG. 4(a) and the skew of FIG. 4(b) have been introduced so that a line through the rotor and stator centers is not normal to the rotor and the planes of the rotor and stator are not parallel.

For the position measuring transformer of FIG. 2, the total number, M, of pairs of winding sections on the stator 2 is four; namely, the pairs SI and CI, SII and CII, SIII and CIII, and SIV and CIV. For convenience, a typical pair (e.g. SI and CI) of sine and cosine sections may be identified as the $m^{th}$ pair of sections where m may have any value from 1 to M. For example in FIG. 2, $m=1$ designates sections SI and CI, $m=2$ designates sections SII and CII, and so forth.

Before describing the operation of the FIG. 1 circuit and the manner in which it overcomes errors introduced by eccentricity, skew and other conditions similar to those represented by FIGS. 4(a) through 4(c), an analysis of the expected errors from such conditions is useful.

The following error analysis is presented in order to mathematically explain the differences between measurements made with ideal position measuring transformers and measurements made with transformers exhibiting skew only, exhibiting eccentricity only, and exhibiting eccentricity plus skew together. For an ideal position measuring transformer, an electrical energization of the sine and cosine windings of the stator causes the resultant signal (error signal) in the rotor winding to null at a certain space angle X. If the rotor is rotated to an angle different from X, then of course, a non-null resultant signal is generated.

When the condition of skew alone is introduced into the afore-mentioned energized, ideal transformer, the transformer still is operative to null at the identical space angle, namely at X. The reason that skew alone does not alter the space angle at which the transformer nulls is because, for each change in the coupling (appearing as a gain change resulting from the air gap change) caused by the displacement of a winding section of one type (e.g. sine), there is a corresponding and compensating coupling change caused by an adjacent winding section of the opposite type (cosine).

In a similar manner, when the condition of eccentricity alone is introduced into the afore-mentioned energized, ideal transformer, the space angle at which the transformer nulls is again identical to X. The reason that eccentricity alone does not alter the space angle at which the transformer nulls is that for each change in coupling (due to a shift resulting from eccentricity) caused by the displacement of a stator winding section of one type (e.g. sine), an equal but opposite change in coupling (due to an equal but electrically opposite shift) is caused by the displacement of a stator winding section of the same type (sine) located 180° in space therefrom.

In summary, the effects of skew along are compensated by equal changes in coupling of adjacent winding sections of opposite type (sine and cosine), and the effects of eccentricity alone are compensated by equal but opposite changes in coupling of 180°-spaced winding sections of the same type (sine and cosine. As discussed in more detail hereinafter, the compound effects of skew and eccentricity, however, are not compensated giving rise to errors. With these errors, the resultant signal does not null at the ideal space angle X, but at that angle X modified by some error angle.

The reason that the compound effects of skew and eccentricity are not compensated, in the general case, is that the winding sections spaced apart by 180°, which normally cause equal but opposite changes in coupling as a result of eccentricity, have their couplings unequally modified as a result of skew so that the changes in coupling do not sum to zero. As a special case, these changes do sum to zero when the eccentricity axis E–E' and the skew axis S–S', to be described in further detail hereinafter, are orthogonal.

Error Analysis

For a typical position measuring transformer, similar to that of FIG. 2, the signal, $R_m$, induced in the single winding 51 of the rotor by each $m^{th}$ pair of sine and cosine stator winding sections is given as follows:

$$R_m = Us_m \sin(X_m) + Uc_m \cos(z_m) \qquad \text{Eq. (1)}$$

where:

$Us_m$ = amplitude proportional to signal applied to stator sine winding (between terminals T1 and T9 of FIG. 2)

$Uc_m$ = amplitude proportional to signal applied to stator cosine winding (between terminals D3 and D9 of FIG. 2)

$X_m$ = space angle of $m^{th}$ stator sine winding section with respect to cycle of rotor winding sections $Z_m$ = space angle of $m^{th}$ stator cosine winding section with respect to cycle of rotor winding sections The total signal, R, on the rotor (for example between terminals 56 and 57 of FIG. 2) is derived from Eq. (1) as follows:

$$R = \sum_{m=1}^{M} R_m = \sum_{m=1}^{M} Us_m \sin(X_m) + Uc_m \cos(Z_m) \qquad \text{Eq. (2)}$$

where:

M = total number of pairs of sine and cosine winding sections

Evaluating R using Eq. (2) where no errors are introduced and where the stator sine windings are energized with an electrical signal D (cos Y) (sin wt) and the stator cosine windings are energized with an electrical signal -D(sin Y)(sin wt), $Us_m$ and $Uc_m$ of Eq. (1) become, $$Us_m = (A_m D \cos Y \sin wt) \qquad \text{Eq. (3)}$$
$$Uc_m = (B_m)(-D \sin Y \sin wt) \qquad \text{Eq. (4)}$$

where:

sin wt = the carrier term
Y = the electrical angle
D = amplitude
$A_m$ = the transformation factor for sine windings
$B_m$ = the transformation factor for cosine windings No Skew and No Eccentricity For the condition where no skew exists, $A_m = B_m = A$ for all m since the air gap between rotor and stator is a constant. Similarly with no eccentricity, $Z_m = X_m = X$ for all m since there is a constant and equal rotation of the sine and cosine winding sections of the stator with respect to the rotor. With these assumed non-error conditions giving rise to the constant values A and X, Eq. (2) becomes, $$R = (D \sin wt)(\sin X \cos Y - \cos X \sin Y)(MA)$$
$$R = (D \sin wt)(\sin(X-Y))(MA) \qquad \text{Eq. (5)}$$

As is apparent from Eq. (5), the null condition, $R = 0$, is met where no error conditions exist when the electrical angle Y equals the space angle X.

Eccentricity Alone

When there is a relative shift between the rotor and stator centers, as generally depicted in FIG. 4(a), the condition $Z_m = X_m = X$ for all m assumed above is no longer valid. By way of explanation and referring to FIG. 6, assume the stator center O is shifted along the eccentricity axis E–E' by an amount "e" relative to the rotor center 0'. As a good approximation, that shift has the effect of rotating each winding section, relative to its position before its shift, as a function of the sections angle, $\phi$, relative to the eccentricity axis E–E'.

Figures 6, 7A:
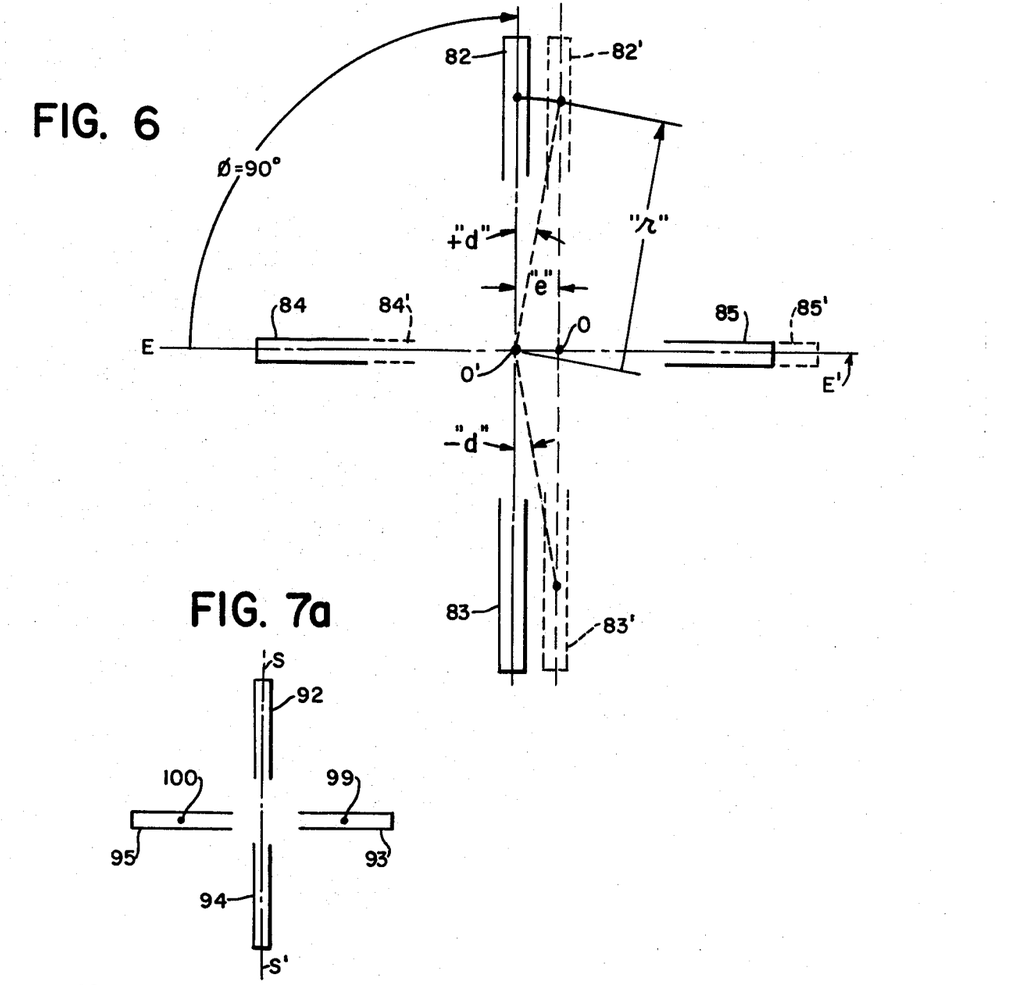
FIG. 6 represents a schematic view of the space shifts of four winding sections which are explanatory of the shifts occuring in the eight stator winding sections of FIG. 2 as a result of eccentricity like that depicted in FIG. 4(a).
FIG. 7(a) and 7(b) represent schematic views of the space shifts of four winding sections which are explanatory of the shifts occuring in the eight stator winding sections of FIG. 2 when skewed in the manner of FIG. 4(b).

Referring to FIG. 6, winding sections before shift are shown solid and after shift, broken. Particularly typical stator winding sections 82, 83, 84 and 85 (shown solid) are symmetrical about their center 0' which is also the center of the rotor winding (not shown). After shift the winding sections 82', 83', 84' and 85' (shown broken) have center O shifted "e" from 0' along axis E–E'. With respect to the center O', the position of the winding section 82' appears rotated by an angle "d" where "d" is approximately "e"/"r" when "r" is the average radius of the winding section 82'. Similarly, the position of winding section 83' appears rotated –"d" with respect to section 83. The position of the winding sections 84' and 85' along the eccentricity axis E–E' do not appear rotated.

Expressions for the $m^{th}$ sine section's apparent rotation, $S_m$, and for the $m^{th}$ cosine section's apparent rotation, $C_m$, as a function of the $m^{th}$ sine section's angle, $\phi_m$, with respect to the eccentricity axis E–E' are, $$S_m = (d) \sin \Phi_m \qquad \text{Eq. (6a)}$$

$$C_m = (d) \sin\left[\phi_m + \frac{360}{M}\right] \qquad \text{Eq. (6b)}$$

An evaluation of Eq. (2) when eccentricity alone is introduced is done using Eq. (3) and Eq. (4), still assuming $A_m =$ $B_m$ for all $m$ (since the air gap remains constant) but using $X_m = X + S_m$ and $Z_m = X + C_m$ for sine and cosine terms, respectively, in accordance with Eqs. (6a) and (6b).

Note that there is a 180° symmetry of sine windings and of cosine windings as described for typical windings in connection with FIG. 6, for each of the values of $X_m$ and $Z_m$ in Eq. (2). That condition also exists for the transformer of FIG. 2. For example, with $m = 1$ and considering the sine terms only $X_1 = X + S_1$ and $X_{(M/2 + 1)} = X - S_1$ and so on until $X_{M/2} = X + S_{M/2}$ and $X_M = X - S_{M/2}$. This plus and minus relationship is identical for the cosine terms and gives rise to the following form for Eq. (2):

$$R = \sum_{m=1}^{M/2} Us \; (\sin \; (X + S_m) + \sin \; (X - S_m))$$
$$+ Uc \; (\cos \; (X + C_m) + \cos \; (X - C_m))$$
$$R = \sum_{m=1}^{M/2} (2Us \sin X \cos (S_m) + 2Uc \cos X \cos (C_m))$$

Eq. (7)

Since to a very good approximation $$\sum_{m=1}^{M/2} \cos (S_m) = \sum_{m=1}^{M/2} \cos (C_m)$$

Eq. 7 becomes, $$R = (Us \sin X + Uc \cos X) \left( 2 \sum_{m=1}^{M/2} \cos S_m \right)$$

Eq. (8)

In a manner analogous to Eq. (5), Eq. (8) becomes, $$R = (D \sin wt) \; (\sin \; (X - Y)) \left( 2A \sum_{m=1}^{M/2} \cos (S_m) \right)$$

Eq. (9)

Comparing Eq. (5) without eccentricity and Eq. (9) with eccentricity reveals that position measuring transformers with eccentricity, as represented by FIG. 4(a), null at the same position as those without eccentricity (FIG. 3), that is $R = 0$ when the space angle X equals the electrical angle Y.

Skew Alone

Figure 7B:
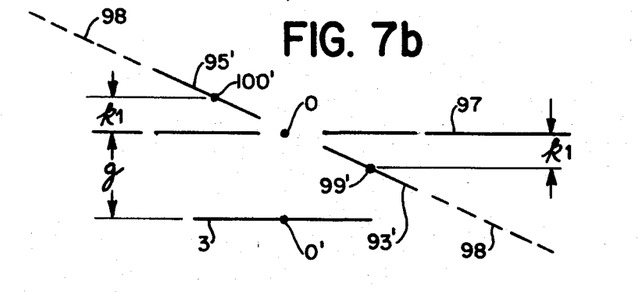

When there is an introduction of skew alone, as generally depicted in FIG. 4(b), the condition that the transformation factors $A_m$ and $B_m$ are the same and equal to A for all sections (all $m$) is no longer valid. By way of explanation and referring to FIG. 7(a) four typical stator winding sections 92, 93, 94 and 95 are shown. When those winding sections 92–95 are parallel to the rotor 3 as when in a plane like plane 97 of FIG. 7(b), the transformation factor is constant because the air gap between rotor and stator is constant. However, when in a plane skewed to the rotor like plane 98, the average air gap for sections 93' and 95' is g-kl and g+kl, respectively, where g is the gap of a non-skewed plane and where kl is the average maximum direction from "g" of the winding sections as measured from the mid-points 99' and 100' of sections 93' and 95', respectively. For winding sections 92 and 94 along a line S–S', called the skew axis, parallel to the rotor 3, the gap is g.

In the general case the gap of sine sections, $Gs_m$, and cosine sections, $Gc_m$, are given by $Gs_m = g - (kl) \sin (\phi_m)$
$Gc_m = g - (kl) \sin (\phi_m + 360/M)$ where, $g =$ the gap of a non-skewed plane
$(kl) =$ the average maximum deviation from "g" of winding sections
$\Phi_m =$ the angle of the $m^{th}$ sine section from the skew axis S–S'

With the above expressions for the air gap, expressions for the transformation factors $A_m$ and $B_m$ are given by $A_m = k e^{Gs_m}$  Eq. (10a)

$B_m = k e^{Gc_m}$  Eq. (10b)

It is evident from Eqs. (10a) and (10b) that $A_m$ and $B_m$ do not equal a constant A for all winding sections, that is, for all $m$. However, for a large number of winding sections, that is for large M, $A_m$ does to a good approximation equal $B_m$ for each value of m since sin $\phi$ and sin $(\phi + 360/M)$ are approximately equal for large M.

Evaluating Eq. (2) with $A_m = B_m$ for each value of $m$ and letting $x_m = X$ yields, $$R = \sum_{m=1}^{M} (B_m D \cos Y \sin wt \sin X$$
$$- B_m D \sin Y \sin wt \cos X)$$

$$R = (D \sin wt) \; (\sin \; (X - Y)) \left[ \sum_{m=1}^{M} B_m \right]$$

Eq. (11)

Comparing Eq. (11) with Eqs. (5) and (9) indicates that the introduction of skew along produces a null ($R = 0$) when the electrical angle Y equals the space angle X in the same manner as with eccentricity alone, Eq. (9), and without either skew or eccentricity, Eq. (5).

Skew + Eccentricity

While the separate effects of skew and eccentricity have been shown to produce the same null result, the compound effects of skew and eccentricity do not, absent the present invention, lead to the same result. Evaluation of Eq. (2), when the compound skew and eccentricity conditions represented by FIG. 4(c) are present, is as follows:

$$R = D \sin wt \sum_{m=1}^{M} (A_m \cos Y \sin X_m - B_m \sin Y \cos Z_m)$$

Eq. (12)

To a good approximation, $A_m = B_m$ for each winding section, that is, each value of m since 360/M becomes small for a large number of total winding sections, that is, for large M as discussed above. Similarly, $S_m = C_m$ to a good approximation for each value of m for large M. Therefore, Eq. (12) becomes, $$R = D \sin wt \sum_{m=1}^{M} B_m \cos Y \sin \; (X + S_m)$$
$$- B_m \sin Y \cos \; (X + S_m)$$

$$R = (D \sin wt) \sum_{m=1}^{M} B_m \sin \; (X - Y) \cos S_m$$
$$+ B_m \cos \; (X - Y) \sin S_m$$

Eq. (13)

It is evident from Eq. (13) that the null condition (R=0) is not achieved when X=Y as desired because, in the most right-hand term, cos (X–Y) is not zero. That right-hand term, therefore, is essentially an error term.

The condition for R=0 in Eq. (12) is met when $$\sum_{m=1}^{M} B_m \sin \; (X - Y) \cos S_m = \sum_{m=1}^{M} B_m \cos \; (X - Y) \sin S_m$$

or, $$\frac{\sin \; (X - Y)}{\cos \; (X - Y)} = \tan \; (X - Y) = \frac{\sum_{m=1}^{M} B_m \sin S_m}{\sum_{m=1}^{M} B_m \cos S_m}$$

Eq. (14)

Accordingly, the null condition is established when X differs from Y by an amount expressed by, $$X - Y = \tan^{-1} \left[ \frac{\sum_{m=1}^{M} B_m \sin S_m}{\sum_{m=1}^{M} B_m \cos S_m} \right]$$

Eq. (15)

As will be discussed hereinafter in more detail, the present invention is directed to group operation of winding sections for reducing the difference between X and Y in order to achieve a null in the presence of the compound effects of skew and eccentricity. The group operation of winding sections is implemented in one embodiment using switching circuitry to select the winding sections on a group by group basis to reduce the effects of skew and eccentricity.

Group Switching and Coupling Networks

Figure 5:
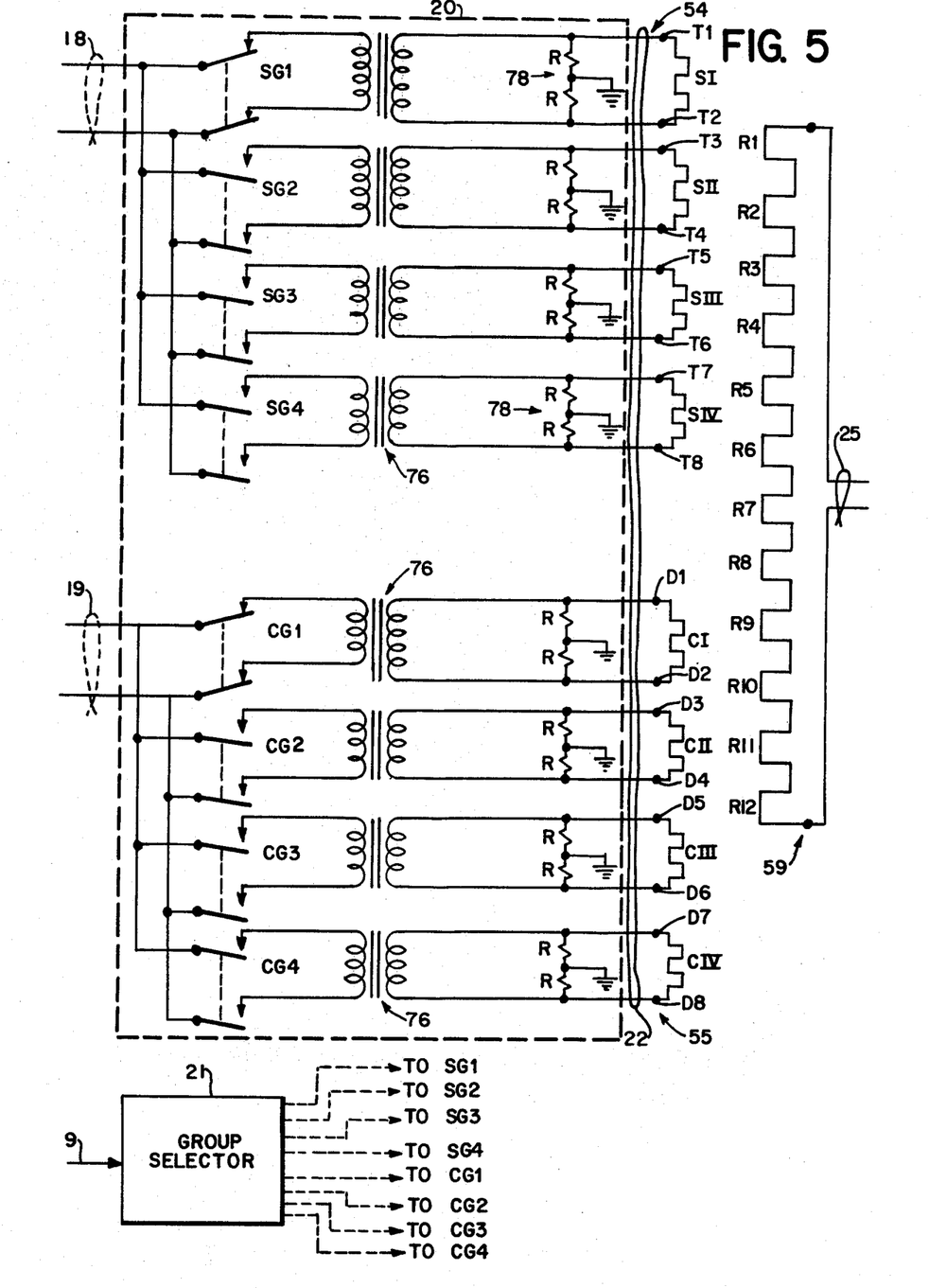
FIG. 5 depicts, in further detail, the switching and coupling network of FIG. 1 connected to a position measuring transformer.

FIG. 5 depicts the switching and coupling network 20 of FIG. 1 in further detail as controlled by group selector 21. In FIG. 5, the sine lines 18, and the cosine lines 19 derived from the D/A converter 17 of FIG. 1 are connected to the switching and coupling network 20. Sine lines 18 are connected in parallel to double pole switches SG1, SG2, SG3, and SG4 which in turn are connected through coupling transformers 76 to the sine windings at the appropriate terminals T1 through T8, corresponding to conductor bars S1 through S8, respectively (see FIG. 2). In a similar manner, the cosine lines 19 are connected through double pole switches CG1, CG2, CG3 and CG4 via independent coupling transformers 76 to the respective cosine terminals D1 through D8, connected respectively to conductor bars C1 through C8 (see FIG. 2). The sine and cosine windings are magnetically coupled to the rotor winding 59 which includes the conductor bars R1 through R12 serially connected and terminating in lines 25.

The switches SG1 through SG4 and CG1 through CG4 are energized under control of a group selector 21. Group selector 21 may be conventional double pole mechanical switches which open and close the double pole contacts of the switches SG1 through SG4, and CG1 through CG4. In an alternative arrangement, the switches may be electronic, such as transistor driven mercury-wetted contacts, energized in a conventional manner by computer 10. In a typical operation, the sine switches and cosine switches are energized in pairs. For example, SG1 and CG1 are initially closed as shown in FIG. 5 with all of the other switches in the open condition. With this closure of switches, the winding group including winding sections SI and CI is energized while all of the other winding groups are not energized. With SG1 and CG1 closed, the winding sections SI and CI magnetically couple the rotor winding 59 to produce a resultant signal on lines 25 as a function of the space angle X of the rotor winding 59 with respect to stator windings 54 and 55.

Switch SG1, like each of the other switches of FIG. 5, is connected through its own transformer 76 and its own balanced grounding network (pair of substantially equal resistors tied to ground) to the sine winding section SI. Alternative grounding may be implemented by using grounded center-tapped windings for each of the secondaries of transformers 76.

After the resultant signal on the lines 25 has been reduced to null either by changing the space angle X through rotating the rotor winding 59 or by changing the electrical angle Y through altering the sine and cosine signals on lines 18 and 19, the first group of windings are de-energized by opening switches SG1 and CG1. Thereafter, the second group of windings including winding sections SII and CII are energized by closing switches SG2 and CG2. Again the signal on the rotor winding 59 is reduced to a null and thereafter the switches SG2 and CG2 are de-energized and the next group of windings are energized by closing switches SG3 and CG3. Thereafter, in a similar manner, the remaining switches SG4 and CG4 are energized.

When it is desired to operate the stator windings 54 and 55 with all of the winding groups simultaneously closed switches SG1 through SG4 and CG1 through CG4 are closed. Such simultaneous operation has all of the winding groups connected in parallel to the sine and cosine lines 18 and 19. Alternatively, appropriate switching (not shown), may be employed to connect all the sine conductor bars S1 through S8 and all the cosine conductor bars C1 through C8 in series. All connections whether serial or parallel are under control in a conventional manner by group selector 21.

Group selector 21, in a preferred embodiment, is a plurality of transistor inputs controlled by computer 10 via line 9 and the switches SG and CG are transistors receiving the inputs. Computer 10 functions to control the base (or gate) current in the transistors, thereby implementing the switching and group selection functions in a conventional manner. Alternatively, the group selector 21 may be toggles on the mechanical double-pole switches depicted in FIG. 5.

Error Analysis With Group Operation

As previously indicated in connection with Eq. (13), the compound effects of skew and eccentricity on the resultant signal R normally prevent that signal from being equal to 0 when the space angle X equals the electrical angle Y. In accordance with the present invention, however, individual groups of winding sections are separately energized and the signal on the rotor is separately nulled so that the effects of skew are to a very good approximation eliminated from the resultant measurement. For example, if each pair of winding sections is separately energized, then Eq. (15) above reduces to a calculation of the difference in space and electrical angles $(X_m - Y)$ for each value of m as follows:

$$X_m - Y = \tan^{-1}(\tan S_m)$$
$$X_m = S_m + Y \qquad \text{Eq. (16)}$$

It is evident from Eq. (16) that the space angle X differs from the electrical angle Y by a term $S_m$. If the separate measurements of $X_m$ for all m are averaged to form $X_{ave}$ the error terms $S_m$ averaged over all m become 0 so that the resultant is that $X_{ave}$ equals Y. It is evident that $S_m$ will average to 0 for the same reasons as previously discussed in connection with the error analysis under the condition of eccentricity alone. More specifically, for each value of m between 1 and M/2, there is an equal and opposite value of $S_m$ for the 180° symmetry points of $S_m$, that is, for values of m equal to $(M/2+1)$ through M, respectively.

For purposes of explanation, consider the position measuring transformer of FIG. 2. When m equals 1, the winding sections SI and CI of the first group are rendered operative by switches SG1 and CG1 in the apparatus of FIG. 1 and FIG. 5. The value of the space angle $X_1$ measured by the operation of the FIG. 1 circuitry in the readout mode considering Eq. (16) is as follows:

$$X_1 = Y + S_1 \qquad \text{Eq. (17)}$$

The value of $S_1$ in Eq. (17) is $(d) \sin \phi_1$ as derived from Eq. (6a). Accordingly and in a similar manner, the values $X_1$, $X_2$, $X_3$, and $X_4$ derived for each of the four groups of winding sections of FIG. 2 are given as follows:

$$X_1 = Y + (d) \sin \Phi_1 \qquad \text{Eq. (18-1)}$$
$$X_2 = Y + (d) \sin \Phi_2 \qquad \text{Eq. (18-2)}$$
$$X_3 = Y - (d) \sin \Phi_1 \qquad \text{Eq. (18-3)}$$
$$X_4 = Y - (d) \sin \Phi_2 \qquad \text{Eq. (18-4)}$$

It is evident that the adding and averaging of the above four equations yields a condition that the average value, $X_{ave}$, of the space angle values $(X_1, X_2, X_3, X_4)$ is equal to the electrical angle Y for measurements made at the null condition. This result is identical to that previously derived for the no error conditions of Eq. (5), the eccentricity alone condition of Eq. (9) and the skew alone condition of Eq. (11).

Furthermore, if Eqs. (18-1) and (18-3) are subtracted, the resultant value is $(2d) \sin \phi_1$, which is a measure of the eccentricity component along an axis I – III bisecting winding groups I and III at an angle $\phi_1$ to the eccentricity axis E–E'. In a similar manner, subtraction of the Eq. (18-4) from Eq. (18-2) results in the value $(2d) \sin \phi_2$ which is a measure of the eccentricity along an axis II – IV bisecting the winding groups II and IV at an angle $\Phi_2$, equal to $\Phi + 90°$, to the eccentricity axis E–E'.

The addition, subtraction and averaging dictated by the above operations is typically carried out using conventional algorithms in computer 10 of FIG. 1.

Further and Other Embodiments

While the number (M) of pairs of winding sections was four in the simplified transformer of FIG. 2, the number of pairs of winding sections is typically much greater, for example, 1024. With this much larger number for M, the approximations relying on the condition that 360/M was small become more valid (see Eq. (6b) et sequal). With M equal to 1024, 1024 different computations of $X_m$ may be performed and averaged to form $X_{ave}$. Rather than 1024 different measurements of $X_m$, however, it has been found that the employment of four winding groups of 256 winding pairs per group provides excellent results. While such a technique of employing four groups does not theoretically completely eliminate the compound effects of skew and eccentricity, the use of four has enabled accuracies in measuring the space angle and measurements of eccentricity heretofore impossible.

Figure 8:
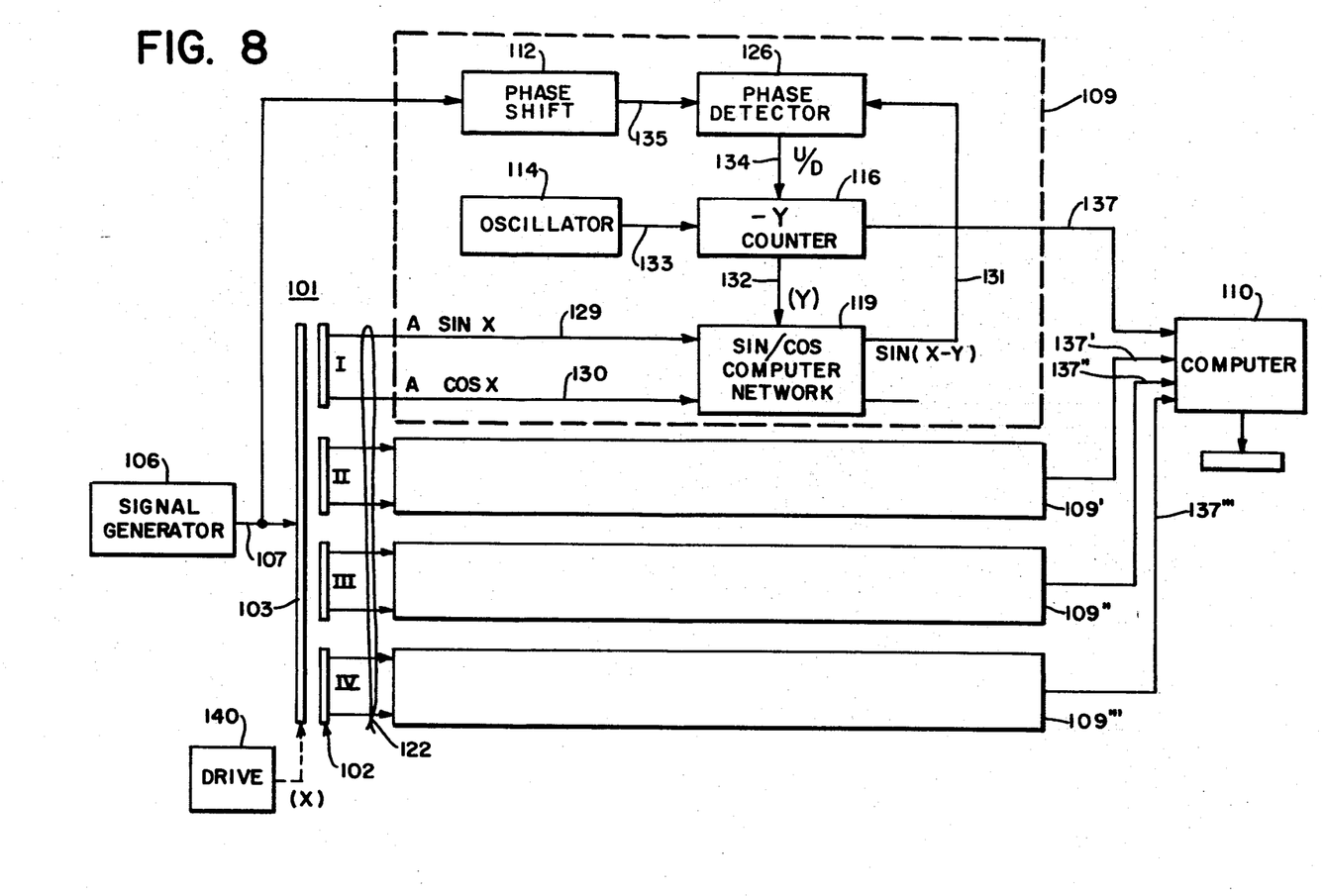
FIG. 8 depicts an alternate embodiment of the present invention again operable in servo and readout modes for positioning and measurement, respectively, where the rotor is energized to induce signals in groups of stator windings.

FIG. 8 depicts another embodiment of the present invention in which a position measuring transformer 101 has its rotor 103 energized in order to induce signals in four groups of windings, I, II, III and IV of winding sections analogous to the groups described in connection with FIG. 2 and FIG. 5. The sine and cosine lines 129 and 130, respectively, from winding group I are connected to a sine/cosine computer network 119.

The computer network 119 is typically like that described in the patent application Sine-Cosine Computer NETWORKS Ser. No. 704,900, filed 2/12/68, by R. W. Tripp, assigned to the same assignee as the present invention. In that patent application, input sin X and cos X signals are applied as inputs in the same manner as the present invention. The computer network (like network 119) is operative to employ another angular input (therein designated $\theta$ and herein designated $-Y$) to form output signals sin (X−Y) and cos (X−Y). In the present invention, only the sin (X−Y) value is employed and it appears on output line 131.

Briefly, the computer network 119, as described in detail in the above-identified patent application, functions to switch the taps on transformer networks as a function of the input angle, -Y. That -Y angle is stored, in the present invention, in the -Y counter 116 which has outputs 132 connected to the computer network 119 (through appropriate switches not shown) to control and select the appropriate transformer taps which correspond to the -Y angle.

A conventional oscillator 114 is connected via line 133 as an input to counter 116 for the purpose of incrementing or decrementing counter 116 in a direction controlled by the up/down (U/D) line 134. The U/D line 134 is derived from a conventional phase detector 126. Phase detector 126 receives the sine (X − Y) signal on line 131. The other input to the phase detector 126 is a reference signal on line 135 derived through the conventional phase-shift circuit 112 (which balances any phase shift attendant transformer 101 and network 119) from the signal applied to the rotor on line 107.

In operation, the phase detector 126 controls line 134 either at a binary positive or negative level so as to cause incrementing or decrementing of counter 116. Counter 116 in turn causes the computer network 119 to drive its output signal on line 131 to a null or zero condition. Such a null condition occurs when the space angle, X, equals the electrical angle, Y, in a manner analogous to that previously described in connection with the prior description of the present invention. When the count in counter 116 represents a value equal to the space angle X, the next pulse from the oscillator 114 on line 133 causes counter 116 to be one count different from the value of the space angle X which in turn will cause the signal on line 131 to be one incremental level different from null which will in turn be detected by phase detector 126 causing the U/D line 134 to change level so as to change the direction of count of counter 116. Therefore, the next pulse from oscillator 114 causes counter 116 to count in the opposite direction so that X and Y are again equal. Further pulses from the oscillator 114 again generate a signal on line 131 which will again cause the U/D line 134 to reverse its level again causing X to equal Y.

Further details as to the operation of a phase detector in combination with an oscillator driven counter like that depicted in the electronic servo circuit 109 are described in the U.S. Pat. application, entitled Trigonometric Signal Generator And Machine Control having Ser. No. 864,079, filed 10/6/69, invented by R. W. Tripp and assigned to the same assignee as the present invention. That application is hereby incorporated by reference in this application for the purpose of teaching the details of phase detector in combination with oscillator driven counters. See specifically, FIG. 18, element 318 and attendant description therein.

The output from the counter 116 is conveyed via a line 137 to a conventional computer 110. Analogous to the electronic servo 109, each of the winding groups, II, III and IV includes an identical electronic servo 109', 109'', and 109''', respectively. Each of those electronic servos 109', 109'', and 109''' is connected via lines 137', 137'', and 137''', respectively, to the computer 110.

Each of the electronic servos functions to transmit to computer 110 the value of the electrical angle Y as a measure of the space angle X for each of the groups of stator windings I, II, III, and IV. Computer 110 forms the average of these measured angles to form a group average, $X_{ave}$, of the space angle which is to a good approximation free of errors caused by the conditions of eccentricity and skew for the reasons previously described.

When a calculation has been rendered for some initial space angle, X, drive 140 may be operated to select a new space angle by rotating rotor 103 whereafter each of the electronic servos 109, 109', 109'', and 109''' electronically servos to form new measurement angles Y. Those measurement angles Y are again averaged in computer 110 to form the measurement for $X_{ave}$.

Computer 110 may also be employed in a conventional manner to form the difference between the I and III winding groups and the II and IV winding groups. As previously described, these different values are measures of the eccentricity components along the respective axes.

While the invention has been described principally with respect to rotary position measuring transformers, the method and apparatus are applicable to linear position measuring transformers. For example, if the windings of a linear transformer exhibit a variable air gap, such as may be caused by Inductosyn bar scales having discrete air gap differences from bar to bar or by Inductosyn tape scales exhibiting undulations along its length, an error causing condition analogous to skew in rotary devices exists. Similarly, if the direction of travel of the slider with respect to the scale is non-parallel to an axis running through the scale lengthwise, an error condition analogous to eccentricity in rotary devices exists. With such error-causing conditions in linear transformers, the group energization techniques of the present invention are effective to minimize errors resulting from the compound effects of such conditions.

Although the present invention has been described employing the convention that the space-quadrature windings are mounted, for rotary devices, upon the stator and the single continuous winding is mounted upon the rotor and similarly that the space-quadrature windings are mounted, for linear devices, upon the slider and the continuous winding is mounted upon the scale, it is within the present invention that the space-quadrature and single continuous windings be upon any of the members. For the purposes of this application, the terms stator, rotor, slider, and scale are all interchangeable. While the invention applies to conventional rotary and linear devices, it also applies to spiral or other type devices such as described in U.S. Pat. No. 2,900,612.

Although the present invention has been described in terms of position measuring transformers which employ space-quadrature windings so as to describe a sine/cosine two-phase system, it will of course be realized that three-phase or other polyphase systems may be employed within the spirit of the present invention. Similarly, while the present invention has been described for an amplitude sensitive system, the invention is equally applicable to phase sensitive systems.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A position measuring apparatus including first and second relatively movable members, one of said members including a first winding of periodically spaced conductors which define a reference cycle, the other of said members including at least one winding group having at least two spaced windings reactively coupled to said first winding for defining a space angle as a function of the position of said spaced windings relative to said first winding, said apparatus including at least one source of electrical signals defining an electrical angle to form at least one measurement signal and further including means for nulling said measurement signal by rendering the space angle equal to the electrical angle, the improvement comprising,
   a plurality of independently operable winding groups on said other of said members, each group including first and second spaced winding sections reactively coupled to said first winding, and each group spaced relative to said first winding to define independently the same said space angle,
   means for supplying electrical signals defining an electrical angle independently for each of said winding groups to form a separate measurement signal for each of said winding groups,
   means for independently nulling each of said separate measurement signals for each of said winding groups.

2. The apparatus of claim 1 wherein said first winding sections are positioned at periodic first locations and said second winding sections are positioned at periodic second locations in space-quadrature with respect to said reference cycle.

3. The apparatus of claim 1 further including,
   means responsive to said measurement signals for forming, for each of said winding groups, a digital representation of the relative space position of said members as measured by each of said winding groups.

4. The apparatus of claim 3 further including,
   means for recording and averaging said digital representations to form a resultant digital representation of the relative space position of said members.

5. The apparatus of claim 4 wherein said members are rotary in form and wherein there are four winding groups arranged to form four quadrants, respectively, on said other member.

6. The apparatus of claim 3 further including,
   switching means for sequentially energizing said winding groups so as to sequentially produce said measurement signals and said digital representations.

7. The apparatus of claim 3 wherein said members are relatively rotable, wherein each winding group has an associated winding group located 180 degrees about a first axis, and wherein said first winding is distributed in a rotary pattern on said one member about a second axis where the second axis may exhibit some eccentricity with respect to said first axis, said apparatus further comprising,
   means for measuring said eccentricity between said first and second axes includes means for subtracting the digital representation for each winding group from the digital representation for the 180 degree associated winding group.

8. The apparatus of claim 7 wherein the number of said winding groups is four for obtaining two components, each along an axis orthogonal to the other, of the eccentricity between said first and second axes.

9. The apparatus of claim 2 wherein said winding groups are symmetrically disposed in a rotary pattern on a stator and wherein said first winding is disposed in a rotary pattern on a rotor forming a position measuring transformer wherein the rotor forms a space angle X with respect to the stator, said apparatus further comprising,
   means for independently energizing said first winding sections in each winding group with an electrical signal proportional to $(A)\sin(Y)$ and said second winding sections in each winding group with an electrical signal proportional to $(A)\cos(Y)$ so as to induce a resultant signal in said first winding proportional to $(A)\sin(X-Y)$,
   means for changing one of the values X or Y while holding the other value fixed to reduce said resultant signal to a null and thereby to indicate that the changed value equals the fixed value.

10. The apparatus of claim 9 wherein,
    said means for changing comprises a digital to analog converter including a digital counter registering said value Y and means for changing the count in said digital counter to change the value of Y.

11. The apparatus of claim 10 further including a digital display connected to and operative to display the contents of said digital counter.

12. The apparatus of claim 2 wherein said winding groups are symmetrically disposed in a rotary pattern on a stator and wherein said first winding is disposed in a rotary pattern on a rotor forming a position measuring transformer wherein the rotor forms a space angle X with respect to the stator, said apparatus further comprising,
    means for energizing said first winding with a constant amplitude AC signal whereby electrical signals of the form $(A)\sin(X)$ and $(A)\cos(X)$ are induced in each winding group,
    computer network means responsive to said signals of the form $(A)\sin(X)$ and $(A)\cos(X)$ to produce a resultant signal proportional to $(A)\sin(X-Y)$, and
    meanS for changing one of the values X or Y while holding the other value fixed to reduce said resultant signal to a null and to thereby indicate that the changed value equals the fixed value.

13. The apparatus of Claim 12 wherein,
    said means for changing includes a digital counter for registering the value Y and wherein said digital counter and said computer network means are responsive to said resultant signal.

14. A position measuring apparatus including,
    a transformer having a rotor relatively movable with respect to a stator for generating measurement signals as a function of electrical input signals functionally related to an electrical angle Y and as a function of the relative space position of said rotor and stator as measured by a space angle $X$, said rotor including a continuous winding having active conductor bars defining a pole cycle, said stator including sine and cosine windings,
    a digital-to-analog converter for energizing said sine winding with an electrical signal functionally related to $\cos(Y)$ to produce a signal proportional to $\sin(X)\cos(Y)$ and for energizing said cosine winding with an electrical signal functionally related to $\sin(Y)$ to produce a signal proportional to $\cos(X)\sin(Y)$ thereby forming a resultant signal in said continuous winding proportional to $\sin(X-Y)$ for controlling said digital-to-analog converter,
    a digital counter for storing a digital representation of the electrical angle Y,
    a counter control connected to receive said resultant signal and for causing said digital counter to change its contents until said resultant signal is a null,
    a digital computer connected to said digital counter for recording the contents of said digital counter each time a null condition is detected, the improvement comprising,
    a plurality of independently operable winding groups on said stator, each group inductively coupled to said continuous winding, each group including a plurality of winding sections of sine and cosine significance in space-quadrature of the pole cycle of the continuous winding, each alternate winding section of one significance for each group interconnected to form a sine winding for inducing in said continuous winding a signal related to sin(X), each other alternate winding section of the other significance for each group interconnected to form a cosine winding for inducing in said continuous winding a signal related to cos(X), automatic switching means for sequentially energizing each of said winding groups with the signals from said digital-to-analog converter so as to form said digital representation of Y for each group and for recording each digital representation of Y in said computer, and means in said computer for averaging said recorded digital representations of Y in order to form a resultant measure of the space angle X.

15. The method of measuring the relative space angle X of the rotor with respect to the stator of a position measuring device wherein the rotor includes a single continuous winding, and wherein the stator includes a plurality of winding groups trigonometrically related to the continuous winding, comprising the independent performance for each of said winding groups of the following steps, energizing the winding of a group with signals proportional to trigonometric functions of an electrical angle Y so as to induce a resultant signal in the continuous winding proportional to sin(X−Y), altering the electrical angle Y until a null condition is reached when X equals Y, and recording a digital representation of Y when the null condition is reached to thereby form a measure of the value X.

16. The method of claim 15 further including the steps of,
averaging said recorded digital representations to form a resultant value as a measure of the space angle X.

17. The method of claim 15 further including the steps of,
subtracting said recorded digital representations for winding groups having 180° position relationship to form a component measure of the eccentricity of the stator windings with respect to the rotor winding.

* * * * *